Dec. 2, 1930.  L. FERDINAND  1,783,875
BUMPER
Filed April 21, 1930
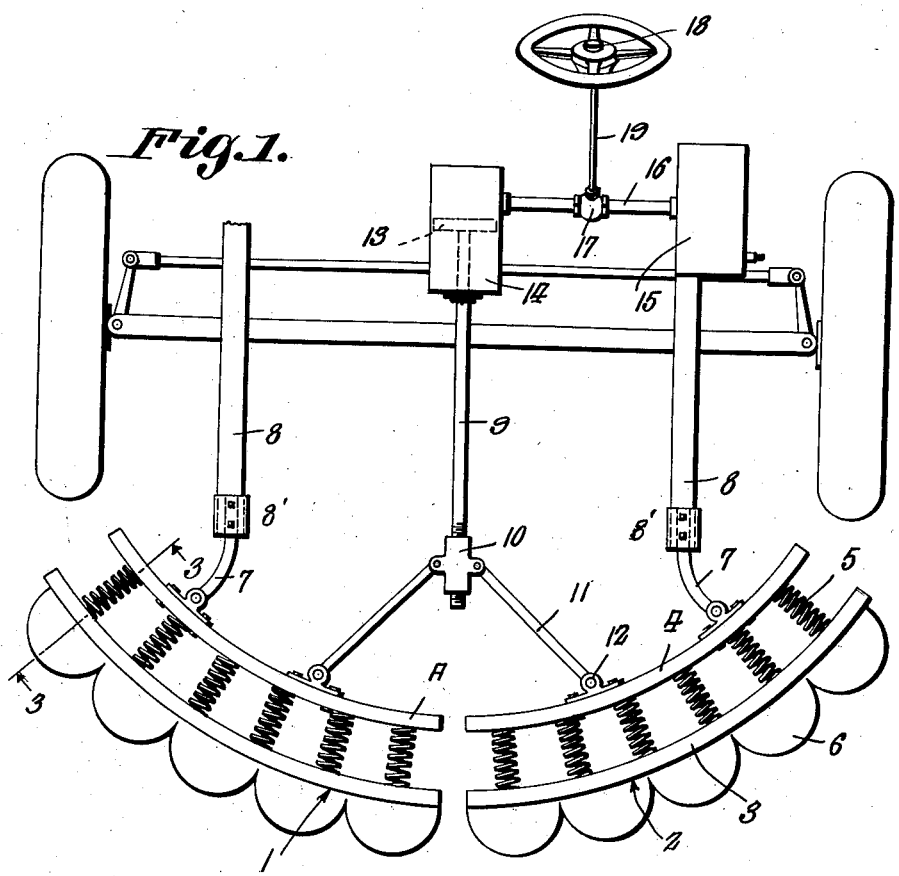
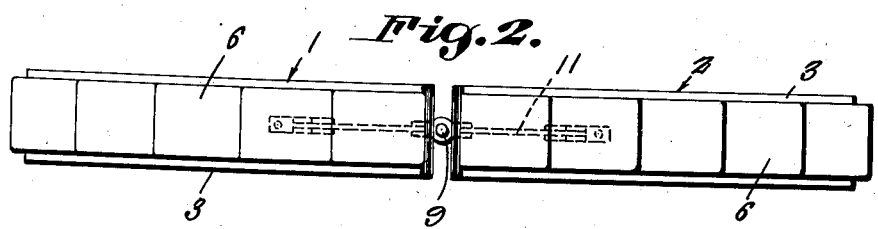
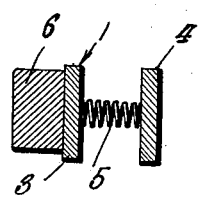
Louis Ferdinand,
INVENTOR
BY Victor J. Evans
ATTORNEY Patented Dec. 2, 1930

1,783,875

UNITED STATES PATENT OFFICE

LOUIS FERDINAND, OF DRIFTON, PENNSYLVANIA

BUMPER

Application filed April 21, 1930. Serial No. 446,055.

This invention relates to a bumper for use on motor vehicles and the like, the general object of the invention being to make the bumper of two sections, each section being pivotally connected to a part of the vehicle, with means for enabling the driver to swing the sections on their pivotal points when he sees he is about to strike an object so that the force of the impact is broken and thus damage to the vehicle is prevented.

A further object of the invention is to provide compressed air means controlled from a point adjacent the driver's seat for swinging the sections on their pivots and to make each section of front and rear parts connected together by springs and to place members formed of rubber or the like on the front member so that the springs and rubber members absorb shocks of objects striking the bumper.

This invention also consists in certain other features of construction and in the combination and arrangement of the several parts, to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:—

Figure 1 is a diagrammatic plan view of the device.

Figure 2 is a front view.

Figure 3 is a section on line 3—3 of Figure 1.

In these views, the letter A indicates the bumper which is composed of the sections 1 and 2, each section being of curved shape and composed of the front bar 3 and the rear bar 4. Coil springs 5 are placed between the front and rear bars and curved blocks 6 of rubber or the like are fastened to the front bar. The rear bars are pivoted to the arms 7 which are connected with the front ends of the front springs 8 of the vehicle by the clamps 8', so that the sections of the bumper can be swung forwardly and rearwardly on their pivots.

A shaft 9 has its front end threaded to receive a threaded collar 10 and links 11 connect the collar with the rear bars of the bumper sections, the connection being a pivotal one, as shown at 12. A piston 13 is fastened to the rear end of the bar 9 and operates in a cylinder 14 which is connected to a tank 15 containing compressed air by a pipe 16. A valve 17 is arranged in the pipe and a button 18 on the steering wheel or any other suitable part adjacent the driver's seat is connected with the valve by a link 19, so that by depressing the button, the valve can be opened to permit some of the compressed air in the tank 15 to pass into the cylinder 14 and thus force the piston 13 forwardly. This forward movement of the piston will expand the links 11 so that the bumper sections will be swung forwardly and outwardly to break the force of an impact with another car or other object coming from the side.

By swinging the bumper sections forwardly by the compressed air operated means, the air in the cylinder 14 will form a cushion which helps the springs 5 to absorb the shock caused by the bumper striking an object.

The main object of the device is to provide means for preventing damage to the body of the car when the car strikes an object and also to reduce the danger of injury to a person struck by a vehicle equipped with the bumper.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:—

1. A bumper for a vehicle comprising a pair of sections arranged in a horizontal plane, means for pivotally connecting the outer end of each section to a front part of a vehicle and means connected with the inner ends of the members for moving said members forwardly and outwardly.

2. A bumper for a vehicle comprising a pair of sections arranged in a horizontal plane, means for pivotally connecting the outer end of each section to a front part of a vehicle, means connected with the inner ends of the members for moving said members forwardly and outwardly, such means comprising a cylinder, a piston therein, a rod connected with the piston, means for connecting the outer end of the rod to each section whereby forward movement of the rod will cause swinging movement of the sections, a supply of compressed fluid connected with the cylinder and means for controlling the flow of fluid from such means to the cylinder.

3. A bumper for a vehicle comprising a pair of sections, each composed of front and rear members, springs connecting the members together and cushions carried by the front member, means for pivotally connecting the outer part of the rear member of each section to a front part of a vehicle, a cylinder, a piston therein, a rod connected with the piston, a member adjustably connected with the forward end of the rod, links connecting said member with the inner parts of the rear members of the two sections, a tank of compressed fluid, a pipe connecting the same with the cylinder and manually operated means for controlling the flow of fluid through said pipe.

In testimony whereof I affix my signature.

LOUIS FERDINAND.